(12) United States Patent
Weitzel

(10) Patent No.: US 7,288,580 B2
(45) Date of Patent: Oct. 30, 2007

(54) WATER-REDISPERSIBLE POLYMER POWDER COMPOSITIONS WITH ACCELERATED-SETTING ACTION

(75) Inventor: Hans-Peter Weitzel, Reischach (DE)

(73) Assignee: Wacker Polymer Systems GmbH & Co. KG, Burghausen (DE)

(*) Notice: Subject to any disclaimer, the term of this patent is extended or adjusted under 35 U.S.C. 154(b) by 326 days.

(21) Appl. No.: 10/684,741

(22) Filed: Oct. 14, 2003

(65) Prior Publication Data

US 2004/0097622 A1    May 20, 2004

(30) Foreign Application Priority Data

Nov. 14, 2002    (DE) ................... 102 53 045

(51) Int. Cl.
*C04B 24/26*    (2006.01)
(52) U.S. Cl. ............. 524/5; 524/4; 524/7; 524/8; 524/247
(58) Field of Classification Search ........... 524/4–5, 524/247, 7–8
See application file for complete search history.

(56) References Cited

U.S. PATENT DOCUMENTS

| | | | | |
|---|---|---|---|---|
| 4,670,505 A | * | 6/1987 | Craig ................. | 524/704 |
| 5,703,156 A | * | 12/1997 | Sauer ................. | 524/802 |
| 5,922,796 A | * | 7/1999 | Colombet et al. ..... | 524/300 |
| 5,959,029 A | * | 9/1999 | Koelliker et al. ..... | 525/57 |
| 6,001,913 A | * | 12/1999 | Thames et al. ....... | 524/398 |
| 6,028,167 A | * | 2/2000 | Pakusch et al. ...... | 528/502 E |
| 6,063,865 A | * | 5/2000 | Ball et al. .......... | 525/57 |
| 6,369,153 B1 | * | 4/2002 | Guerin et al. ....... | 524/523 |
| 6,716,922 B1 | * | 4/2004 | Dreher et al. ....... | 525/191 |
| 6,841,595 B2 | * | 1/2005 | Brizzolara et al. ... | 524/2 |
| 2004/0019141 A1 | * | 1/2004 | Bastelberger et al. . | 524/261 |

FOREIGN PATENT DOCUMENTS

| | | |
|---|---|---|
| DE | 197 51 512 | 5/1999 |
| EP | 0 723 975 | 7/1996 |
| EP | 0 894 822 | 2/1999 |
| EP | 1 136 507 | 9/2001 |
| EP | 1 136 507 A1 | 9/2001 |
| EP | 1 167 317 A1 | 1/2002 |
| WO | WO 97/15616 | 5/1997 |
| WO | WO 97/15617 | 5/1997 |

OTHER PUBLICATIONS

Polymer Handbook, 2nd Edition, J. Wiley & Sons, New York (1975).
Fox T.G., Bull. Am. Physics Soc. 1, 3, p. 123 (1956).

* cited by examiner

*Primary Examiner*—Peter Szekely
(74) *Attorney, Agent, or Firm*—Brooks Kushman P.C.

(57) ABSTRACT

Water-redispersible polymer powder compositions with accelerated-setting action based on homo- or copolymers of one or more monomers of vinyl esters of optionally branched $C_{1-15}$ alkylcarboxylic acids, (meth)acrylic esters of $C_{1-15}$ alcohols, vinylaromatics, olefins, dienes, and vinyl halides, one or more protective colloids, and optionally antiblocking agent(s), contain one or more setting-accelerants $NR_3$, $R_2N$—$(CH_2)_n$—$NR_2$, or one or more singly or doubly $NH_2$-terminated polyalkylene glycols having a $C_1$-$C_6$-alkylene group is/are present, where n=from 1 to 4, and where the radicals R are identical or different, and are hydrogen, a $C_1$-$C_6$-alkyl radical, or a $C_1$-$C_6$-hydroxyalkyl radical, where at least one radical R is a $C_1$-$C_6$-hydroxyalkyl radical, and wherein the setting-accelerants may optionally be present in the form of their salts.

35 Claims, No Drawings

WATER-REDISPERSIBLE POLYMER POWDER COMPOSITIONS WITH ACCELERATED-SETTING ACTION

BACKGROUND OF THE INVENTION

1. Field of the Invention

The invention relates to water-redispersible polymer powder compositions with accelerated-setting action, to a process for their preparation, and to the use of these powders in hydraulically setting systems.

2. Background Art

Polymers based on vinyl esters, vinyl chloride, (meth)acrylate monomers, styrene, butadiene, and ethylene are used in a wide variety of applications, especially in the form of their aqueous dispersions or water-redispersible polymer powders, for example as coating compositions or adhesives for a very wide variety of substrates. Protective colloids or low-molecular-weight surface-active compounds are used to stabilize these polymers. The protective colloids generally used comprise polyvinyl alcohols.

These products are in particular used as binders in hydraulically setting adhesives, for example in tile adhesives based on cements or calcium sulfates.

Concrete is a very versatile material whose properties can be controlled via numerous parameters. Important properties are, inter alia, workability as a function of time and strength (early strength and final strength) of the concrete. Workability reduces with time as the hydration of the material proceeds. On account of this effect it is possible to add either more water or "superplasticizers". However, both have an adverse effect on the initial and final strength of the concrete. To compensate for these disadvantages, "accelerators" or materials which promote early strength are added, these leading to higher initial and final strength.

EP-A 1136507 describes tertiary alkanolamines as accelerators long known to those skilled in the art. A disadvantage is that these compounds are highly active nucleophiles and therefore hydrolyze the ester groups in the polymer-containing binders generally used, which are based on vinyl acetate-ethylene copolymers or on styrene-acrylate copolymers, and degrade the effectiveness of the binders as well. In EP-A 1136507 the alkanolamines are therefore linked by a complicated method to a polymer skeleton.

EP-A 1167317 relates to water-soluble, fluoride-containing or sulfate-containing aluminum salts as accelerators for setting and hardening.

SUMMARY OF THE INVENTION

It was an object of the invention, to provide a method of using alkanolamine-based accelerators without complicated polymer synthesis and without adversely affecting the other components in the concrete. This and other objects are attained by incorporating at least one amino-terminated polyalkylene glycol or hydroxyalkylamino-functional accelerator compound in a redispersible polymer powder.

DETAILED DESCRIPTION OF THE PREFERRED EMBODIMENT(S)

The subject invention is thus directed to employing an accelerator as a constituent of a redispersion powder composition. Surprisingly, it is found that despite the presence of large amounts of low-molecular-weight organic compounds, the properties of the redispersion powder, for example blocking resistance and flowability, are not adversely affected.

The invention provides water-redispersible polymer powder compositions with accelerated-setting action based on homo- or copolymers of one or more monomers from the group consisting of vinyl esters of unbranched or branched ("optionally branched") alkylcarboxylic acids having from 1 to 15 carbon atoms, methacrylic esters and acrylic esters ("(meth)acrylic esters") of alcohols having from 1 to 15 carbon atoms, vinylaromatics, olefins, dienes, and vinyl halides, and one or more protective colloids, and, where appropriate, antiblocking agents, wherein one or more compounds $NR_3$ or $R_2N$—$(CH_2)_n$—$NR_2$ are present, where n=from 1 to 4, and where the radicals R are identical or different, and are hydrogen, a $C_1$-$C_6$-alkyl radical, or a $C_1$-$C_6$-hydroxyalkyl radical, where at least one radical R is a $C_1$-$C_6$-hydroxyalkyl radical, or one or more singly or doubly $NH_2$-terminated polyalkylene glycols having a $C_1$-$C_6$-alkylene group is/are present, and the compounds $NR_3$, $R_2N$—$(CH_2)_n$—$NR_2$, and also the $NH_2$-terminated polyalkylene glycols, are optionally present in the form of their salts.

Preferred singly or doubly $NH_2$-terminated polyalkylene glycols are singly or doubly amino-terminated polyethylene glycols (PEGs), singly or doubly amino-terminated polypropylene glycols (PPGs), and also singly or doubly amino-terminated EO-PO copolymers. Preferred compounds $R_2N$—$(CH_2)_n$—$NR_2$ contain from one to four ethanolamine, propanolamine, or isopropanolamine radicals, or else hydrogen radicals, methyl radicals, ethyl radicals, or propyl radicals, n being 2. Particular preference is given to N,N,N',N'-tetrakis(2-hydroxypropyl)ethylenediamine. Preferred compounds $NR_3$ contain from one to three ethanolamine or isopropanolamine radicals, or else hydrogen radicals, methyl radicals, ethyl radicals, or propyl radicals. Preference is given to ethanolamine, diethanolamine, triethanolamine, N-methyldiethanolamine, triisopropanolamine, N,N-dimethylethanolamine. Particular preference is given to the use of triisopropanolamine, diethanolamine, triethanolamine, and N-methyldiethanolamine. The amount of the setting-acceleratants generally used is from 0.1 to 25% by weight, preferably from 1 to 10% by weight, based in each case on the total weight of the powder composition. The setting-accelerator compounds mentioned may also be used in the form of their salts of inorganic, or preferably, organic acids. Particular preference is given to the salts of formic acid and acetic acid.

Vinyl esters suitable for the base polymer are those of carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 13 carbon atoms, for example VeoVa9® or VeoVa10®, available from Resolution Products. Vinyl acetate is particularly preferred.

Suitable (meth)acrylates include esters of unbranched or branched ("optionally branched") alcohols having from 1 to 15 carbon atoms, for example methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate, and 2-ethylhexyl acrylate.

Examples of olefins and dienes include ethylene, propylene, and 1,3-butadiene. Suitable vinylaromatics include styrene and vinyltoluene. One suitable vinyl halide is vinyl chloride.

Where appropriate, it is also possible to copolymerize from 0.05 to 50% by weight, preferably from 1 to 10% by weight, based on the total weight of the base polymer, of auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric or maleic acid, such as the diethyl and diisopropyl esters; maleic anhydride; and ethylenically unsaturated sulfonic acids and their salts, preferably vinylsulfonic acid and 2-acrylamido-2-methylpropanesulfonic acid. Other examples are precrosslinking comonomers such as unsaturated comonomers having two or more ethylenic unsaturated double bonds, e.g. divinyl adipate, diallyl maleate, allyl methacrylate or triallyl cyanurate, or postcrosslinking comonomers, e.g. acrylamidoglycolic acid (AGA), methyl methacrylamidoglycolate (MAGME), N-methylolacrylamide (NMA), N-methylolmethacrylamiden (NMMA), allyl N-methylolcarbamate, alkyl ethers or esters of N-methylolacrylamide, of N-methylolmethacrylamide, or of allyl N-methylolcarbamate, such as their isobutoxy ethers. Other suitable auxiliary monomers are epoxy-functional comonomers such as glycidyl methacrylate or glycidyl acrylate. Further examples of auxiliary monomers are silicon-functional comonomers, e.g. acryloxypropyltri(alkoxy)- and methacryloxypropyltri(alkoxy)silanes, vinyltrialkoxysilanes and vinylmethyldialkoxysilanes. Examples of alkoxy groups which may be present include methoxy radicals, ethoxy radicals, and ethoxypropylene glycol ether radicals. Mention may also be made of monomers having hydroxyl or CO groups, such as hydroxyalkyl (meth)acrylates, e.g. hydroxyethyl, hydroxypropyl or hydroxybutyl (meth)acrylates, and also compounds such as diacetoneacrylamide and acetylacetoxyethyl (meth)acrylate.

Examples of suitable homo- and copolymers are vinyl acetate homopolymers, copolymers of vinyl acetate with ethylene, copolymers of vinyl acetate with ethylene and with one or more other vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

Preference is given to vinyl acetate homopolymers; copolymers of vinyl acetate containing from 1 to 40% by weight of ethylene; copolymers of vinyl acetate containing from 1 to 40% by weight of ethylene and from 1 to 50% by weight of one or more other vinyl ester comonomers having from 1 to 12 carbon atoms in the carboxy radical, e.g. vinyl propionate, vinyl laurate, vinyl esters of alpha-branched carboxylic acids having from 9 to 13 carbon atoms, e.g. VeoVa9, VeoVa10, VeoVa11; copolymers of vinyl acetate, from 1 to 40% by weight of ethylene and preferably from 1 to 60% by weight of acrylates of unbranched or branched alcohols having from 1 to 15 carbon atoms, in particular n-butyl acrylate or 2-ethylhexyl acrylate; and copolymers containing from 30 to 75% by weight of vinyl acetate, from 1 to 30% by weight of vinyl laurate or vinyl ester(s) of alpha-branched carboxylic acids having from 9 to 11 carbon atoms, and also from 1 to 30% by weight of acrylates of unbranched or branched alcohols having from 1 to 15 carbon atoms, in particular n-butyl acrylate or 2-ethylhexyl acrylate, which also contain from 1 to 40% by weight of ethylene; and copolymers containing vinyl acetate, from 1 to 40% by weight of ethylene, and from 1 to 60% by weight of vinyl chloride; where all the polymers may also contain auxiliary monomers, and the percentages by weight in each case total 100% by weight.

Preference is also given to (meth)acrylate polymers, such as copolymers of n-butyl acrylate or 2-ethylhexyl acrylate, or copolymers of methyl methacrylate with n-butyl acrylate and/or 2-ethylhexyl acrylate; styrene-acrylate copolymers with one or more methyl acrylate, ethyl acrylate, propyl acrylate, n-butyl acrylate, and 2-ethylhexyl acrylate monomers; vinyl acetate-acrylate copolymers with one or more methyl acrylate, ethyl acrylate, propyl acrylate, n-butyl acrylate, and 2-ethylhexyl acrylate monomers, and optionally, ethylene; and styrene-1,3-butadiene copolymers, where all the polymers may also contain auxiliary monomers, and the percentages by weight total 100% by weight.

The selection of monomers and the selection of the proportions by weight of the comonomers takes place in such a way that the resultant glass transition temperature Tg is generally from −50° C. to +50° C., preferably from −30° C. to +40° C. The glass transition temperature Tg of the polymers may be determined in a known manner by differential scanning calorimetry (DSC). The Tg may also be approximated by the Fox equation. According to T. G. Fox, BULL. AM. PHYSICS SOC. 1, 3, page 123 (1956): $1/(Tg=x_1/Tg_1 + x_2/Tg_2 + \ldots + x_n/Tg_n/Tg_n$, where $x_n$ is the proportion by weight (% by weight/100) of monomer n and $Tg_n$, is the glass transition temperature in degrees Kelvin of the homopolymer of monomer n. Tg values for homopolymers are listed in POLYMER HANDBOOK 2nd Edition, J. Wiley & Sons, New York (1975).

The homo- and copolymers are prepared by emulsion polymerization or suspension polymerization, preferably by emulsion polymerization, generally at a polymerization temperature of from 40 to 100° C., preferably from 60 to 90° C. When gaseous comonomers such as ethylene, 1,3-butadiene, or vinyl chloride are copolymerized, it is also possible to operate under pressure, generally between 5 bar and 100 bar.

The polymerization is initiated using initiators commonly used for emulsion polymerization or suspension polymerization, these being water-soluble or monomer-soluble initiators, or redox initiator combinations. Examples of water-soluble initiators are the sodium, potassium, and ammonium salts of peroxydisulfuric acid, hydrogen peroxide, tert-butyl peroxide, tert-butyl hydroperoxide, potassium peroxydiphosphate, tert-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The amount of the initiators used is generally from 0.001 to 0.02% by weight, preferably from 0.001 to 0.01% by weight, based in each case on the total weight of the monomers.

Redox initiators are combinations of the foregoing initiators with reducing agents. Suitable reducing agents are the sulfites and bisulfites of alkali metals and of ammonium, for example sodium sulfite, the derivatives of sulfoxylic acid, such as the formaldehyde-sulfoxylate of zinc or of an alkali metal, e.g. sodium hydroxymethanesulfinate, and ascorbic acid. The amount of reducing agent is generally from 0.001 to 0.03% by weight, preferably from 0.001 to 0.015% by weight, based in each case on the total weight of the monomers.

To control the molecular weight, regulating substances ("chain transfer agents") may be used during the polymerization. If regulators are used, they are usually used in amounts of from 0.01 to 5.0% by weight, based on the monomers to be polymerized, and are fed separately or else dosed in a form premixed with reaction components. Examples of substances of this type are n-dodecyl mercaptan, tert-dodecyl mercaptan, mercaptopropionic acid, methyl mercaptopropionate, isopropanol, and acetaldehyde.

Suitable protective colloids are polyvinyl alcohols; polyvinyl acetals; polyvinylpyrrolidones; polysaccharides in water-soluble form, e.g. starches such as amylose and amylopectin, celluloses and their carboxymethyl, methyl, hydroxyethyl, hydroxypropyl derivatives; proteins such as casein or caseinate, soy protein, and gelatin; lignosulfonates; synthetic polymers such as poly(meth)acrylic acid, copolymers of (meth)acrylates with carboxy-functional comonomer units, poly(meth)acrylamide, polyvinylsulfonic acids and their water-soluble copolymers; melamine-formaldehyde sulfonates, naphthalene-formaldehyde sulfonates, styrene-maleic acid copolymers, and vinyl ether-maleic acid copolymers.

Preference is given to partially hydrolyzed or fully hydrolyzed polyvinyl alcohols whose degree of hydrolysis is from 80 to 100 mol %, in particular partially hydrolyzed polyvinyl alcohols whose degree of hydrolysis is from 80 to 95 mol % and whose Höppler viscosity in 4% aqueous solution is from 1 to 30 mPas (Höppler method at 20° C., DIN 53015). Preference is also given to partially hydrolyzed, hydrophobicized polyvinyl alcohols whose degree of hydrolysis is from 80 to 95 mol % and whose Höppler viscosity in 4% by weight aqueous solution is from 1 to 30 mPas. Examples of these are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates, and dialkyl fumarates, e.g. diisopropyl maleate and diisopropyl fumarate, vinyl chloride, vinyl alkyl ethers such as vinyl butyl ether, and olefins such as ethene and decene. The proportion of the hydrophobic units is preferably from 0.1 to 10% by weight, based on the total weight of the partially hydrolyzed polyvinyl alcohols. Mixtures of polyvinyl alcohols may also be used.

Most preference is given to polyvinyl alcohols whose degree of hydrolysis is from 85 to 94 mol % and whose Höppler viscosity in 4% by weight aqueous solution is from 3 to 15 mPas (Höppler method at 20° C., DIN 53015). The protective colloids mentioned are accessible by means of processes known to the person skilled in the art, their total amounts generally used during the polymerization being from 1 to 20% by weight, based on the total weight of the monomers.

If the polymerization is carried out in the presence of emulsifiers, the amount of these is preferably from 1 to 5% by weight, based on the amount of monomer. Suitable emulsifiers include anionic, cationic, and non-ionic emulsifiers, for example anionic surfactants such as alkyl sulfates whose chain length is from 8 to 18 carbon atoms, alkyl or alkyl aryl ether sulfates having from 8 to 18 carbon atoms in the hydrophobic radical and up to 40 ethylene oxide or propylene oxide units, alkyl- or alkylarylsulfonates having from 8 to 18 carbon atoms, esters and half-esters of sulfosuccinic acid with monohydric alcohols or with alkylphenols, or non-ionic surfactants such as alkyl polyglycol ethers or alkylaryl polyglycol ethers having from 8 to 40 ethylene oxide units.

After conclusion of the polymerization, post-polymerization may be carried out by known methods to remove residual monomer, generally using redox-catalyst-initiated post-polymerization. Volatile residual monomers may also be removed by distillation, preferably at reduced pressure, and, where appropriate, by passing inert carrier gases such as air, nitrogen, or steam, through or over the product. The aqueous dispersions thus obtainable preferably have a solids content of from 30 to 75% by weight, more preferably from 50 to 60% by weight.

To prepare the water-redispersible polymer powders, the aqueous dispersions are dried, optionally after adding protective colloid(s) as spraying aids, for example by means of fluidized-bed drying, freeze drying, or spray drying. The dispersions are preferably spray dried. This spray drying may take place in conventional spray drying systems, with atomization by means of single-, twin-, or multifluid nozzles, or using a rotating disk. The discharge temperature selected is generally in the range from 45° C. to 120° C., preferably from 60° C. to 90° C., depending on the system, the Tg of the resin, and the desired degree of drying.

The total amount of the (protective colloid) spraying aid used is generally from 3 to 30% by weight, based on the polymeric constituents of the dispersion. This means that the total amount of protective colloid prior to the drying procedure is to be from 3 to 30% by weight, based on the polymer content; it is preferable to use from 5 to 20% by weight of protective colloid, based on the polymer content.

Suitable spraying aids are partially hydrolyzed polyvinyl alcohols; polyvinylpyrrolidones; polysaccharides in a water-soluble form, such as starches, for example amylose and amylopectin, celluloses and their carboxymethyl, methyl, hydroxyethyl or hydroxypropyl derivatives; proteins such as casein or caseinate, soy protein, or gelatin; lignosulfonates; synthetic polymers such as poly(meth)acrylic acid, copolymers of (meth)acrylates with carboxy-functional comonomer units, poly(meth)acrylamide, polyvinylsulfonic acids and water-soluble copolymers of these; melamine-formaldehyde sulfonates, naphthalene-formaldehyde sulfonates, styrene-maleic acid copolymers, and vinyl ether-maleic acid copolymers. It is preferable that no protective colloids other than polyvinyl alcohols are used as spraying acid.

Up to 1.5% by weight of antifoam, based on the weight of the base polymer, has often proven useful during spraying. An antiblocking agent (anticaking agent), preferably at up to 30% by weight based on the total weight of polymeric constituents may be added to the powder obtained in order to increase storage stability via an increase in blocking resistance, in particular in the case of powders with a low glass transition temperature. Examples of antiblocking agents are calcium carbonate, magnesium carbonate, talc, calcium sulfate, silica, kaolins, and silicates, with particle sizes preferably in the range from 10 nm to 10 μm.

The viscosity of the feed to be sprayed is adjusted via the solids content so as to give a "Brookfield viscosity" (at 20 revolutions and 23° C.) of less than 500 mPas, preferably less than 250 mPas. The solids content of the dispersion to be sprayed is greater than 35%, preferably greater than 40%.

In order to improve performance characteristics, other additives may be added during the spraying process. Examples of other constituents present in preferred embodiments of dispersion powder compositions are pigments, fillers, foam stabilizers, and hydrophobicizing agents.

To prepare the polymer powder composition, the setting-accelerator component is added to the appropriate polymer dispersion immediately prior to the spray drying process, in order to minimize the time available for hydrolysis processes. When the setting-accelerator component is used in salt form, the amine or the amino-terminated polyalkylene glycol is neutralized in advance, using an acid, and is sprayed in salt form together with the dispersion to give the powder. Where appropriate, the setting-accelerator component may also be added after the drying process in powder form. For this, it is preferably absorbed onto a pulverulent carrier material such as silica.

The water-redispersible polymer powder compositions may be used in the application sectors typical for these, for example in construction chemistry products, where appropriate in association with hydraulically setting binders such as cements (Portland, alumina, pozzalanic, slag, magnesia, and phosphate cement), calcium sulfate, and water glass, for producing construction adhesives, in particular tile adhesive and exterior insulation system adhesive, plasters and renders, trowelling compositions, floor-filling compositions, self-leveling compositions, sealing slurries, jointing mortars, or paints. Preferred application sectors are spray mortar or spray concrete for construction work in civil or structural engineering, and in the lining of tunnel walls.

The advantage of the redispersible polymer powder composition is based on the fact that supplying the composition in solid supply form makes it impossible for hydrolysis reactions to proceed, and there is therefore no effect on the binder. Another advantage is the fact there is less need for component handling by the user at the construction site, and that the solid form is easier to handle than combustible organic liquid compounds, such as alkanolamines.

EXAMPLES

Polymer Dispersion:

The dispersion used comprises a polyvinyl alcohol stabilized dispersion of a copolymer of vinyl acetate and ethylene. The preparation method was emulsion polymerization. 10% by weight of a polyvinyl alcohol whose degree of hydrolysis was 88 mol % and whose Höppler viscosity was 4 mPas were used for stabilization. The composition of the copolymer was 92% by weight of vinyl acetate and 8% by weight of ethylene.

Redispersion Powders:

The powders were prepared by spray drying of the dispersion previously mentioned accompanied with addition of the accelerator and 8% by weight of a polyvinyl alcohol whose degree of hydrolysis was 88 mol % and whose Höppler viscosity was 4 mPas. The dispersion was then sprayed by means of a twin-fluid nozzle. Air previously compressed to 4 bar served as the spraying component, and the droplets formed were dried using air heated to 125° C. and flowing concurrently. The resultant dried powder was treated with 10% by weight commercially available anti-blocking agent, a mixture of calcium magnesium carbonate and magnesium hydrosilicate.

Accelerators:

The alkanolamines were either used directly or treated in advance with the equimolar amount of formic acid (FA) or adjusted to a pH of from 5 to 6. The following alkanolamines were used:

MDEA = N-methyldiethanolamine
TEA = triethanolamine
DEA = diethanolamine
TPA = triisopropanolamine Testing:

The powders obtained were tested for powder properties, and for the effectiveness of the accelerator in concrete.

Flowability:

Flowability was assessed visually via angle of rest.

Determination of Blocking Resistance:

To determine blocking resistance, the dispersion powder was placed in an iron pipe with a thread, and then subjected to a load from a metal ram. After the load had been applied, the material was stored for 16 hours at 50° C. in a drying cabinet. After cooling to room temperature, the powder was removed from the tube, and resistance to blocking was determined qualitatively by crushing the material. Resistance to blocking was classified as follows:

1-3 = very good blocking resistance
4-6 = good blocking resistance
7-8 = satisfactory blocking resistance
9-10 = not resistant to blocking - powder no longer free-flowing after crushing of the material.

Determination of Sedimentation Performance TS:

The sedimentation performance of the redispersion serves as a measure of the redispersibility of the powder. The redispersions were produced at 50% strength by weight in water by the action of high shear. Sedimentation performance was then determined on diluted redispersions (0.5% solids content), and for this 100 ml of this dispersion was charged to a graduated tube, and the sedimentation height of solid was measured. The data given are mm of sediment after 24 hours. Values greater than 7 indicate inadequate redispersion of the powder.

Determination of Setting Performance (Temperature Curve):

The setting performance of the cementious system was determined by monitoring the heat of hydration when the powders were used. A polymer cement factor of 0.1 and a water cement factor of 0.4 were used for the test, the cement used for the test being class CEM I 42.5R from Rohrdorf. The test variable is the temperature of the material, this being determined by means of a test probe. The time taken to achieve maximum temperature is recorded. The test results are presented in Table 1.

From the data, it can be seen that there is no adverse effect on the properties of the powders which include the accelerant. Flowability, blocking resistance, and redispersibility remain substantially unaltered. In contrast, the positive effect on the setting of the cement is clearly visible. As required, the materials exhibit a markedly accelerated temperature increase.

TABLE 1

| Example | Accelerator | Amount (% by wt.) | Flow-ability | Blocking grade | TS (24 h) | T max (min) |
|---|---|---|---|---|---|---|
| 1 | MDEA | 10 | good | 4.0 | 5.8 | 20 |
| 2 | TEA | 10 | good | 5.0 | 5.4 | 17 |
| 3 | DEA | 10 | good | 4.5 | 4.3 | 25 |
| 4 | TPA | 10 | good | 5.0 | 4.9 | 23 |
| 5 | MDEA | 5 | good | 5.0 | 6.3 | 24 |
| 6 | TEA | 5 | good | 5.5 | 5.8 | 18 |
| 7 | DEA | 5 | good | 4.0 | 6.7 | 27 |
| 8 | TPA | 5 | good | 6.0 | 6.2 | 28 |
| 9 | MDEA + FA | 10 | good | 4.5 | 1.6 | 26 |
| 10 | TEA + FA | 10 | good | 4.5 | 3.0 | 22 |
| 11 | DEA + FA | 10 | good | 4.5 | 1.6 | 28 |
| 12 | TPA + FA | 10 | good | 5.0 | 5.0 | 24 |
| 13 | MDEA + FA | 5 | good | 4.0 | 1.6 | 25 |
| 14 | TEA + FA | 5 | good | 4.0 | 3.4 | 26 |

TABLE 1-continued

| Example | Accelerator | Amount (% by wt.) | Flow-ability | Blocking grade | TS (24 h) | T max (min) |
|---|---|---|---|---|---|---|
| 15 | DEA + FA | 5 | good | 5.0 | 0.8 | 30 |
| 16 | TPA + FA | 5 | good | 4.0 | 6.3 | 29 |
| 17 | none | 0 | good | 4.0 | 2.5 | 420 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A setting accelerant and water-redispersible polymer powder composition which accelerates the setting of hydraulically settable cementitious compositions, comprising an admixture of the separate components
    a) one or more water-redispersible polymers prepared by polymerizing a monomer mixture consisting of
        a)i) from 90 weight percent to 100 weight percent of one or more monomers selected from the group consisting of vinyl esters of optionally branched $C_{1-15}$ alkylcarboxylic acids; (meth)acrylic esters of alcohols selected from the group consisting of methanol, ethanol, propanol, n-butanol, 2-ethylhexanol, and norbornol; vinyl aromatics; monoolefins; diolefins; and vinyl halides, and
        a)ii) optionally up to 10 weight percent of one or more auxilliary monomers selected from the group consisting of ethylenically unsaturated carboxamides, ethylenically unsaturated carbonitriles, diesters of fumaric acid, diesters of maleic acid, methyl methacrylamidoglycolate, N-methylolacrylamide, -methylolmethacrylamide, N-methylol(meth)acrylamide alkyl ethers, N-methylol(meth)acrylamide alkyl esters, and hydroxyalkyl(meth)acrylates;
    b) from 0.1 to 25 weight percent of at least one alkanolamine-functional setting accelerant selected from the group consisting of $NR_3$, $R_2N$—$(CH_2)_2$—$NR_2$ and singly amino-terminated or doubly amino-terminated polyoxyalkylene glycols having $C_{1-3}$ alkylene groups, where the radicals R each independently are H, $C_{1-6}$ alkyl, or $C_{1-6}$ hydroxyalkyl, the accelerants optionally present as salts of an inorganic or organic acid, and wherein in the compounds $NR_3$, from 1 to 3 R are hydroxyethyl radicals, 2-hydroxypropyl radicals, or mixtures thereof; in the compounds $R_2N$—$(CH_2)_n$—$NR_2$, from 1 to 4 R are hydroxyethyl radicals, hydroxypropyl radicals, or 2-hydroxypropyl radicals; and wherein the polyxoyalkylene glycols are polyoxyethylene glycols, polyoxypropylene glycols, or EO-PO copolymer glycols,
said redispersible polymer powder composition further comprising
    c) at least one protective colloid,
    d) optionally one or more antiblocking agent(s), and
wherein said composition is prepared by adding said accelerant to an aqueous dispersion of protective colloid-containing after polymer polymerization is completed and spray drying the composition, or the polymer is spray dried in the form of an aqueous dispersion in the presence of a protective colloid to form a redispersible polymer powder, and the accelerant is admixed in powder form with the redispersible polymer powder.

2. The composition of claim 1 wherein no auxiliary monomers are present.

3. The composition of claim 1, wherein the water-redispersible polymer powder is selected from the group consisting of vinyl acetate homopolymers; copolymers of vinyl acetate and ethylene; copolymers of vinyl acetate, ethylene, and at least one vinyl ester different from vinyl acetate; copolymers of vinyl acetate, ethylene, and (meth)acrylate ester; copolymers of vinyl acetate, ethylene, and vinyl chloride; copolymers of styrene and (meth)acrylic ester; and copolymers styrene and 1,3-butadiene, and mixtures thereof.

4. A setting accelerant and water-redispersible polymer powder composition which accelerates the setting of hydraulically settable cementitious compositions, comprising an admixture of the separate components
    a) at least one water-redispersible polymer powder selected from the group consisting of vinyl acetate homopolymers; copolymers of vinyl acetate containing from 1 to 40% by weight of ethylene; copolymers of vinyl acetate containing from 1 to 40% by weight of ethylene and from 1 to 50% by weight of one or more other vinyl ester comonomers having from 1 to 12 carbon atoms in the carboxy radical, copolymers of vinyl acetate, from 1 to 40% by weight of ethylene and from 1 to 60% by weight of n-butyl acrylate or 2-ethylhexyl acrylate; and copolymers containing from 30 to 75% by weight of vinyl acetate, from 1 to 30% by weight of vinyl laurate or vinyl ester(s) of alpha-branched carboxylic acids having from 9 to 11 carbon atoms, and from 1 to 30% by weight of n-butyl acrylate or 2-ethylhexyl acrylate, and from 1 to 40% by weight of ethylene; and copolymers containing vinyl acetate, from 1 to 40% by weight of ethylene, and from 1 to 60% by weight of vinyl chloride,
    b) from 0.1 to 25 weight percent of at least one alkanolamine-functional setting accelerant selected from the group consisting of $NR_3$, $R_2N$—$(CH_2)_2$—$NR_2$ and singly amino-terminated or doubly amino-terminated polyoxyalkylene glycols having $C_{1-3}$ alkylene groups, where the radicals R each independently are H, $C_{1-6}$ alkyl, or $C_{1-6}$ hydroxyalkyl, the accelerants optionally present as salts of an inorganic or organic acid, and wherein in the compounds $NR_3$, from 1 to 3 R are hydroxyethyl radicals, 2-hydroxypropyl radicals, or mixtures thereof; in the compounds $R_2N$—$(CH_2)_n$—$NR_2$, from 1 to 4 R are hydroxyethyl radicals, hydroxypropyl radicals, or 2-hydroxypropyl radicals; and wherein the polyxoyalkylene glycols are polyoxyethylene glycols, polyoxypropylene glycols, or EO-PO copolymer glycols.

5. The composition of claim 1, wherein said polymer comprises one or more polymers selected from the group consisting of copolymers of n-butyl acrylate, copolymers of 2-ethylhexyl acrylate, copolymers of methyl methacrylate with n-butyl acrylate and 2-ethylhexyl acrylate; copolymers of methylmethacrylate and n-butylacrylate; styrene-acrylate copolymers containing at least one of methyl acrylate, ethyl acrylate, propyl acrylate, n-butyl acrylate, and 2-ethylhexyl acrylate; vinyl acetate-acrylate copolymers with at least one of methyl acrylate, ethyl acrylate, propyl acrylate, n-butyl acrylate, and 2-ethylhexyl acrylate and optionally, ethylene; and styrene-1,3-butadiene copolymers.

6. The composition of claim 1, where the accelerants are not in the form of a salt.

7. A setting accelerant and water-redispersible polymer powder composition which accelerates the setting of hydraulically settable cementitious compositions, comprising an admixture of the separate components
   a) a one or more water-redispersible polymers prepared by polymerizing a monomer mixture consisting of
      a)i) from 90 weight percent to 100 weight percent of one or more monomers selected from the group consisting of vinyl esters of optionally branched $C_{1-15}$ alkylcarboxylic acids; (meth)acrylic esters of alcohols selected from the group consisting of methanol, ethanol, propanol, n-butanol, 2-ethylhexanol, and norbornol; vinyl aromatics; monoolefins; diolefins; and vinyl halides, and
      a)ii) optionally up to 10 weight percent of one or more auxilliary monomers selected from the group consisting of ethylenically unsaturated carboxamides, ethylenically unsaturated carbonitriles, diesters of fumaric acid, diesters of maleic acid, methyl methacrylamidoglycolate, N-methylolacrylamide, -methylolmethacrylamide, N-methylol(meth)acrylamide alkyl ethers, N-methylol(meth)acrylamide alkyl esters, and hydroxyalkyl(meth)acrylates;
   b) from 0.1 to 25 weight percent of at least one alkanolamine-functional setting accelerant selected from the group consisting of $NR_3$, $R_2N$—$(CH_2)_2$—$NR_2$ and singly amino-terminated or doubly amino-terminated polyoxyalkylene glycols having $C_{1-3}$ alkylene groups, where the radicals R each independently are H, $C_{1-6}$ alkyl, or $C_{1-6}$ hydroxyalkyl, the accelerants optionally present as salts of an inorganic or organic acid, and wherein in the compounds $NR_3$, from 1 to 3 R are hydroxyethyl radicals, 2-hydroxypropyl radicals, or mixtures thereof; in the compounds $R_2N$—$(CH_2)_n$—$NR_2$, from 1 to 4 R are hydroxyethyl radicals, hydroxypropyl radicals, or 2-hydroxypropyl radicals; and wherein the polyoxyalkylene glycols are polyoxyethylene glycols, polyoxypropylene glycols, or EO-PO copolymer glycols,
said redispersible polymer powder composition further comprising
   c) at least one protective colloid,
   d) optionally one or more antiblocking agent(s), and
wherein said composition is prepared by adding said accelerant to an aqueous dispersion of protective colloid-containing after polymer polymerization is completed and spray drying the composition, or the polymer is spray dried in the form of an aqueous dispersion in the presence of a protective colloid to form a redispersible polymer powder, and the accelerant is admixed in powder form with the redispersible polymer powder,
wherein the accelerants are in the form of a salt with formic acid, acetic acid, or a mixture thereof.

8. The composition of claim 1, wherein at least one accelerant is selected from the group consisting of ethanolamine, triethanolamine, N-methyldiethanolamine, triisopropanolamine, N, N-dimethylethanolamine, N,N,N',N'-tetrakis[2-hydroxypropyl]ethylenediamine, salts thereof, and mixtures thereof.

9. A setting accelerant and water-redispersible polymer powder composition which accelerates the setting of hydraulically settable cementitious compositions, comprising an admixture of the separate components
   a) one or more water-redispersible polymers prepared by polymerizing a monomer mixture consisting of
      a)i) from 90 weight percent to 100 weight percent of one or more monomers selected from the group consisting of vinyl esters of optionally branched $C_{1-15}$ alkylcarboxylic acids; (meth)acrylic esters of alcohols selected from the group consisting of methanol, ethanol, propanol, n-butanol, 2-ethylhexanol, and norbornol; vinyl aromatics; monoolefins; diolefins; and vinyl halides, and
      a)ii) optionally up to 10 weight percent of one or more auxilliary monomers selected from the group consisting of ethylenically unsaturated carboxamides, ethylenically unsaturated carbonitriles, diesters of fumaric acid, diesters of maleic acid, methyl methacrylamidoglycolate, N-methylolacrylamide, -methylolmethacrylamide, N-methylol(meth)acrylamide alkyl ethers, N-methylol(meth)acrylamide alkyl esters, and hydroxyalkyl(meth)acrylates;
   b) from 0.1 to 25 weight percent of at least one alkanolamine-functional setting accelerant selected from the group consisting of ethanolamine, triethanolamine, N-methyldiethanolamine, triisopropanolamine, N,N-dimethylethanolamine, N,N,N',N-tetrakis[2-hydroxypropyl]ethylenediamine, and mixtures thereof;
wherein the accelerants are in the form of a salt with formic acid, acetic acid, or a mixture thereof.

10. The powder composition of claim 9, wherein the setting accelerant is present in an amount of from 1 to 10 weight percent.

11. A water-redispersible polymer powder composition with accelerated-setting action, comprising one or more vinyl acetate/ethylene copolymers; one or more protective colloids; optionally one or more antiblocking agent(s); and from 0.1 to 25 weight percent in total, based on the overall weight of the composition, of one or more setting-accelerants $NR_3$, $R_2N$—$(CH_2)_n$—$NR_2$ or singly or doubly $NH_2$-terminated polyalkylene glycols having a $C_{1-C6}$-alkylene group, where n=from 1 to 4, and where the radicals R are identical or different, and are hydrogen, a $C_1$-$C_6$-alkyl radical, or a $C_1$-$C_6$-hydroxyalkyl radical, and where the compounds $NR_3$, $R_2N$—$(CH_2)_n$—$NR_2$, and the $NH_2$—terminated polyalkylene glycols are optionally present in the form of their salts, wherein the compounds $NR_3$ contain from one to three ethanolamine or isopropanolamine radicals, and optionally hydrogen radicals, methyl radicals, ethyl radicals, propyl radicals, or mixtures thereof; the compounds $R_2N$—$(CH_2)_n$—$NR_2$ contain from one to four ethanolamine, propanolamine, or isopropanolamine radicals, and optionally hydrogen radicals, methyl radicals, ethyl radicals, propyl radicals, or mixtures thereof, and n=2; and the $NH_2$—terminated polyalkylene glycols are singly or doubly amino-terminated polyethylene glycols, singly or doubly amino-terminated polypropylene glycols, or singly or doubly amino-terminated EO-PO copolymers, and wherein said salts are salts with inorganic and/or organic acids.

12. The powder composition of claim 11, wherein salts are present and are salts of formic acid, acetic acid, or a mixture thereof.

13. The composition of claim 11, wherein said setting accelerant is selected from the group consisting of $R_2N$—$(CH_2)$—$NR_2$, ethanolamine, N-methyldiethanolamine, trisopropanolamine, N,N-dimethylethanolamine, N,N,N',N'-tetrakis[2-hydroxypropyl]ethylenediamine, salts thereof, and mixtures thereof.

14. A process for preparing the water-redispersible polymer powder composition of claim 1, comprising adding from 0.1 to 25 weight percent of at least one setting-accelerant to an aqueous polymer dispersion after completion of polymerization and prior to spray drying the aqueous dispersion, or spraying the setting-accelerant in salt form concurrently with the aqueous polymer dispersion, or adding the setting-accelerant in powder form after spray drying the polymer dispersion, the weight percentage of the setting accelerant based on the total solids of the aqueous dispersion.

15. A process for preparing the water-redispersible polymer powder composition of claim 11, comprising adding from 0.1 to 25 weight percent of at least one setting-accelerant to an aqueous polymer dispersion after completion of polymerization and prior to spray drying the aqueous dispersion, or spraying the setting-accelerant in salt form concurrently with the aqueous polymer dispersion, or adding the setting-accelerant in powder form after spray drying the polymer dispersion, the weight percentage of the setting accelerant based on total solids.

16. A process for the preparation of the powder composition of claim 1, comprising spray drying said polymer in the presence of a protective colloid to form a redispersible polymer powder, and adding said accelerant in powder form to said redispersible polymer powder.

17. The process of claim 14, wherein an antiblocking agent is added to the redispersible polymer powder following spray drying.

18. The process of claim 17, wherein the antiblocking agent comprises one or more of particulate calcium carbonate, magnesium carbonate, talc, calcium sulfate, silica, kolin, or silicate, the antiblocking agent particles having particle sizes in the range of 10 nm to 10 μm.

19. The process of claim 14, wherein at least one protective colloid comprises partially hydrolyzed or fully hydrolyzed and optionally hydrophobicized polyvinyl alcohols having a degree of hydrolysis of from 80 to 100 mol % and having a Höppler viscosity of from 1 to 30 mPas in 4% by weight aqueous solution at 20° C.

20. The process of claim 15, wherein at least one protective colloid comprises partially hydrolyzed or fully hydrolyzed and optionally hydrophobicized polyvinyl alcohols having a degree of hydrolysis of from 80 to 100 mol % and having a Höppler viscosity of from 1 to 30 mPas in 4% by weight aqueous solution at 20° C.

21. The process of claim 16, wherein at least one protective colloid comprises partially hydrolyzed or fully hydrolyzed and optionally hydrophobicized polyvinyl alcohols having a degree of hydrolysis of from 80 to 100 mol % and having a Höppler viscosity of from 1 to 30 mPas in 4% by weight aqueous solution at 20° C.

22. A construction chemistry product comprising at least one hydraulically setting inorganic binder, and the setting accelerant and water-redispersible polymer powder of claim 1.

23. A construction chemistry product comprising at least one hydraulically setting inorganic binder, and the setting accelerant and water-redispersible polymer powder of claim 2.

24. A construction chemistry product comprising at least one hydraulically setting inorganic binder, and the setting accelerant and water-redispersible polymer powder of claim 3.

25. A construction chemistry product comprising at least one hydraulically setting inorganic binder, and the setting accelerant and water-redispersible polymer powder of claim 11.

26. The construction chemistry product of claim 22 wherein said hydraulically setting inorganic binder comprises a Portland cement or an alumina cement.

27. A process for accelerating the setting of a construction chemistry product containing at least one hydraulically setting inorganic binder, comprising adding to said construction chemistry product, water and at least one setting accelerant and water-redispersible polymer powder of claim 1.

28. A process for accelerating the setting of a construction chemistry product containing at least one hydraulically setting inorganic binder, comprising adding to said construction chemistry product, water and at least one setting accelerant and water-redispersible polymer powder of claim 3.

29. A process for accelerating the setting of a construction chemistry product containing at least one hydraulically setting inorganic binder, comprising adding to said construction chemistry product, water and at least one setting accelerant and water-redispersible polymer powder of claim 6.

30. A process for accelerating the setting of a construction chemistry product containing at least one hydraulically setting inorganic binder, comprising adding to said construction chemistry product, water and at least one setting accelerant and water-redispersible polymer powder of claim 7.

31. A process for accelerating the setting of a construction chemistry product containing at least one hydraulically setting inorganic binder, comprising adding to said construction chemistry product, water and at least one setting accelerant and water-redispersible polymer powder of claim 8.

32. A process for accelerating the setting of a construction chemistry product containing at least one hydraulically setting inorganic binder, comprising adding to said construction chemistry product, water and at least one setting accelerant and water-redispersible polymer powder of claim 11.

33. A process for accelerating the setting of a construction chemistry product containing at least one hydraulically setting inorganic binder, comprising adding to said construction chemistry product, water and at least one setting accelerant and water-redispersible polymer powder of claim 12.

34. A process for accelerating the setting of a construction chemistry product containing at least one hydraulically setting inorganic binder, comprising adding to said construction chemistry product, water and at least one setting accelerant and water-redispersible polymer powder of claim 13.

35. A setting accelerant and water-redispersible polymer powder composition which accelerates the setting of hydraulically settable cementitious compositions, comprising an admixture of the separate components a) one or more water-redispersible polymers prepared by polymerizing a monomer mixture consisting of a)i) from 90 weight percent to 100 weight percent of one or more monomers selected from the group consisting of vinyl esters of optionally branched $C_{1-15}$ alkylcarboxylic acids; (meth)acrylic esters of alcohols selected from the group consisting of methanol, ethanol, propanol, n-butanol, 2-ethylhexanol, and norbornol; vinyl aromatics; monoolefins; diolefins; and vinyl halides, and a)ii) optionally up to 10 weight percent of one or more auxilliary monomers selected from the group consisting of ethylenically unsaturated carboxamides, ethylenically unsaturated carbonitriles, diesters of fumaric acid, diesters of maleic acid, methyl methacrylamidoglycolate, N-methylolacrylamide, methylolmethacrylamide, N-methylol(meth)acrylamide alkyl ethers, N-methylol(meth)acrylamide alkyl esters, and hydroxyalkyl(meth)acrylates;

b) from 0.1 to 25 weight percent of at least one alkanolamine-functional setting accelerant selected from the group consisting of $NR_3$, $R_2N-(CH_2)_2-NR_2$ and singly amino-terminated or doubly amino-terminated polyoxyalkylene glycols having $C_{1-3}$ alkylene groups, where the radicals R each independently are H, $C_{1-6}$ alkyl, or $C_{1-6}$ hydroxyalkyl, the accelerants optionally present as salts of an inorganic or organic acid, and wherein in the compounds $NR_3$, from 1 to 3 R are hydroxyethyl radicals, 2-hydroxypropyl radicals, or mixtures thereof; in the compounds $R_2N-(CH_2)_n-NR_2$, from 1 to 4 R are hydroxyethyl radicals, hydroxypropyl radicals, or 2-hydroxypropyl radicals; and wherein the polyoxyalkylene glycols are polyoxyethylene glycols, polyoxypropylene glycols, or EO-PO copolymer glycols, said redispersible polymer powder composition further comprising c) at least one protective colloid, d) optionally one or more antiblocking agent(s), and wherein said composition is prepared by adding said accelerant to an aqueous dispersion of protective colloid-containing after polymer polymerization is completed and spray drying the composition, or the polymer is spray dried in the form of an aqueous dispersion in the presence of a protective colloid to form a redispersible polymer powder, and the accelerant is admixed in powder form with the redispersible polymer powder.

* * * * *

UNITED STATES PATENT AND TRADEMARK OFFICE
CERTIFICATE OF CORRECTION

PATENT NO. : 7,288,580 B2  Page 1 of 1
APPLICATION NO. : 10/684741
DATED : October 30, 2007
INVENTOR(S) : Hans-Peter Weitzel It is certified that error appears in the above-identified patent and that said Letters Patent is hereby corrected as shown below:

Column 12, Line 20, Claim 9:

Delete "N,N,N',N-tetrakis[2-hydroxypropyl]ethylenediamine" and insert therefor

-- N,N,N',N'-tetrakis[2-hydroxypropyl]ethylenediamine --.

Column 12, Line 34, Claim 11:

Delete "$C_1\text{-}C_6$" and insert therefor

-- $C_1\text{-}C_6$ --.

Column 15, Line 1, Claim 35:

Delete "methylolmethacrylamide" and insert therefor

-- methylolmethacrylamide --.

Column 15, Line 11, Claim 35:

Delete "the accelerants optionally present as salts of an inorganic acid".

Signed and Sealed this

Eighth Day of April, 2008

JON W. DUDAS
*Director of the United States Patent and Trademark Office*